US011238610B2

(12) United States Patent
Patel et al.

(10) Patent No.: US 11,238,610 B2
(45) Date of Patent: Feb. 1, 2022

(54) PLACING LARGE OBJECTS AND OBJECTS SEPARATED BY LARGE DISTANCES IN AUGMENTED REALITY

(71) Applicant: Disney Enterprises, Inc., Burbank, CA (US)

(72) Inventors: Mehul Patel, Stevenson Ranch, CA (US); James Voris, San Gabriel, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 56 days.

(21) Appl. No.: 15/233,923

(22) Filed: Aug. 10, 2016

(65) Prior Publication Data

US 2018/0046861 A1   Feb. 15, 2018

(51) Int. Cl.
    *G06T 7/73*        (2017.01)
    *G06F 3/01*        (2006.01)
    (Continued)

(52) U.S. Cl.
    CPC ............ *G06T 7/73* (2017.01); *G06F 1/163* (2013.01); *G06F 3/011* (2013.01); *G06T 19/006* (2013.01); *G06F 2200/1637* (2013.01)

(58) Field of Classification Search
    CPC ... G06T 19/006; G06T 19/20; G06T 2215/16; G06T 7/73; G02B 2027/0178;
    (Continued)

(56) References Cited

U.S. PATENT DOCUMENTS

2012/0249741 A1* 10/2012 Maciocci ............. G06T 15/503
                                                            348/46
2013/0083003 A1    4/2013 Perez et al.
(Continued)

FOREIGN PATENT DOCUMENTS

WO    WO 2016077506 A1 *  5/2016  ........... G06T 19/006

OTHER PUBLICATIONS

Patent Corperation Treaty, International Search Report for PCT/US2017/035523, dated Aug. 15, 2017, pp. 1-2.
(Continued)

*Primary Examiner* — Kenny A Cese
(74) *Attorney, Agent, or Firm* — Dorsey & Whitney LLP

(57) ABSTRACT

Systems and methods are described for placing large objects and objects separated by large distances in an AR environment. An AR headset system may place and generate digital objects using relative geographical coordinates (e.g., latitude, longitude, and altitude) between the user's current position and the object being placed. In one implementation, a digital object's geographical coordinates may be calculated by determining a user's geographical coordinates, using a distance determination device to measure a distance to a boundary in the user's real-world environment within an AR headset's field of view, and calculating an orientation of the AR headset relative to the user's position. In another implementation, a digital object's geographical coordinates may be calculated by determining the user's geographical coordinates, calculating an orientation of the AR headset relative to the user's position, and receiving input at a user input device specifying at what distance to place and generate a digital object.

20 Claims, 7 Drawing Sheets

(51) Int. Cl.
    *G06F 1/16*     (2006.01)
    *G06T 19/00*     (2011.01)

(58) Field of Classification Search
    CPC ..... G06K 9/00671; G06F 3/011; G06F 1/163;
                                                   G06F 2200/1637
    See application file for complete search history.

(56) References Cited

U.S. PATENT DOCUMENTS

| | | |
|---|---|---|
| 2014/0028718 A1 | 1/2014 | Lindner |
| 2014/0125699 A1* | 5/2014 | Lotto .................... G06T 19/006 345/633 |
| 2014/0267419 A1* | 9/2014 | Ballard ................... G06T 11/00 345/633 |
| 2015/0040074 A1 | 2/2015 | Hofmann et al. |
| 2015/0109338 A1 | 4/2015 | Mckinnon et al. |
| 2015/0235433 A1* | 8/2015 | Miller ....................... G06K 9/46 345/633 |
| 2016/0025982 A1* | 1/2016 | Sutherland .......... G06F 3/04815 359/13 |
| 2016/0026253 A1* | 1/2016 | Bradski .............. G02B 27/0172 345/8 |
| 2017/0193705 A1* | 7/2017 | Mullins ................ G06T 19/006 |
| 2017/0278486 A1* | 9/2017 | Ishikawa ................. G06F 3/011 |
| 2018/0005438 A1* | 1/2018 | Mathey-Owens .... G06T 19/006 |
| 2018/0005450 A1* | 1/2018 | Daniels ................ G06T 19/006 |

OTHER PUBLICATIONS

International Preliminary Report on Patentability in PCT/US2017/035523, dated Feb. 12, 2019.

* cited by examiner

PLACING LARGE OBJECTS AND OBJECTS SEPARATED BY LARGE DISTANCES IN AUGMENTED REALITY

TECHNICAL FIELD

The present disclosure relates generally to augmented reality environments, and more particularly, to a system and method for placing large digital objects and digital objects separated by large distances in an augmented reality environment.

BRIEF SUMMARY OF THE DISCLOSURE

Embodiments of the technology disclosed herein are directed to systems and methods for placing large objects and objects separated by large distances in an AR environment. In one embodiment, a digital object may be placed in augmented reality environment by: calculating geographical coordinates of a user, the geographical coordinates of the user including latitude and longitude coordinates; determining a distance to a location visible in a field of view of an augmented reality device used by the user; calculating latitude and longitude geographical coordinates of a digital object based on the calculated geographical coordinates of the user and the determined distance to the location; and storing digital object information associated with the digital object, the digital object information including the digital object's geographical coordinates. In various embodiments, the augmented reality device is an augmented reality headset.

In a further embodiment, the geographical coordinates are calculated based on an orientation of the augmented reality device. In this embodiment, the orientation of the augmented reality device may be determined by: receiving electrical signals generated by a position sensor of the augmented reality device; and processing the received electrical signals to determine an orientation of the augmented reality device. In implementations, the orientation of the augmented reality device is determined in a NESW plane.

In one implementation, the location visible in the field of view is a boundary in a real world environment of the user of the augmented reality device, and the distance is determined using a distance measurement device. Alternatively, in another implementation, the distance to the location is determined by the user inputting the distance into a user input device.

As used herein, the term "augmented reality" generally refers to a view of a physical, real-world environment that is augmented or supplemented by computer-generated or digital information such as video, sound, and graphics. In an AR environment, three-dimensional representations of digital objects may be overlaid over the real-world environment in real time.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Figure 1A:
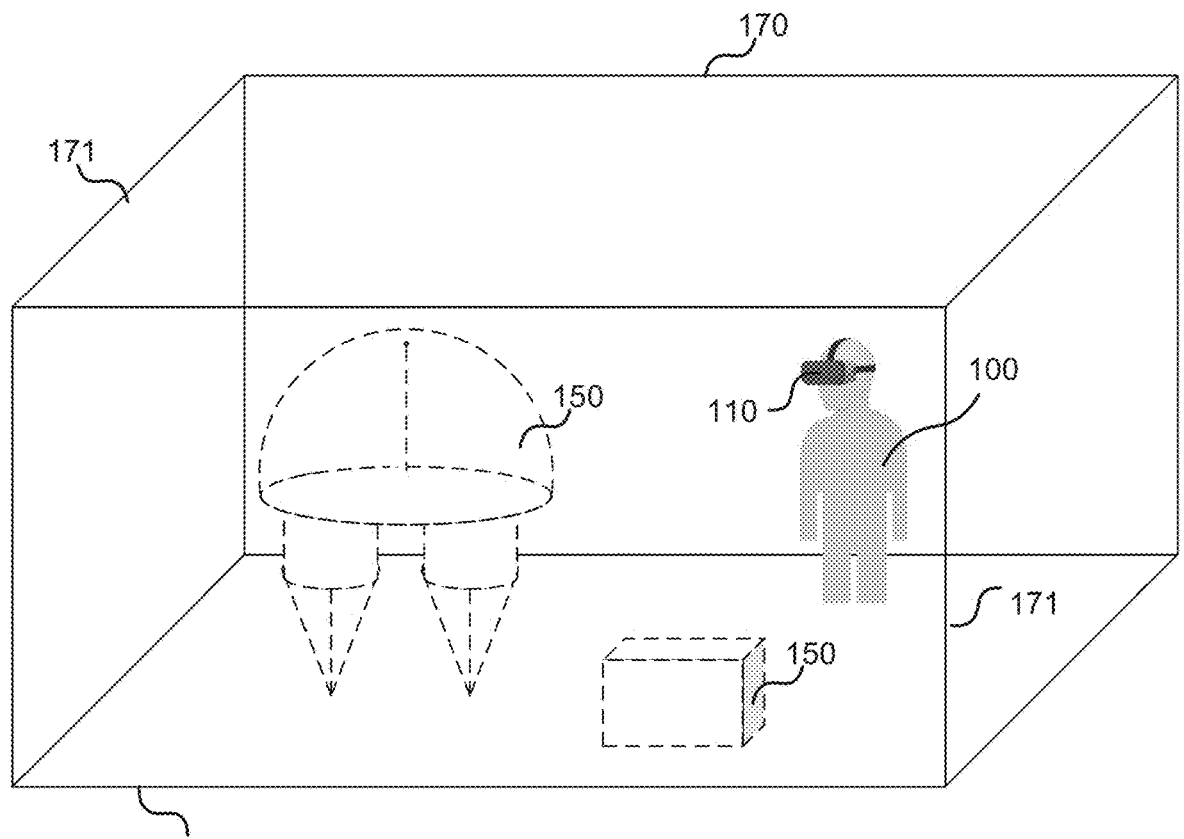
FIG. 1A illustrates a conventional augmented reality environment, as viewed through a display of AR headset, in which a user places virtual digital objects within a room.

For current implementations of AR headsets, environmental boundaries, the depth sensor of the AR headset, and the field of view of the AR headset all limit the user's ability to place three-dimensional digital objects in the augmented reality environment viewed through the AR headset's display. This is illustrated by FIG. 1A, which shows a conventional augmented reality environment, as viewed through a display of AR headset 110, in which a user 100 places virtual digital objects 150 within room 170. In this conventional environment, user 100 is limited to placing objects 150 within the boundaries 171 of a room 170. AR headset 110 scans an area of room 170 within its field of view and allows the user to place digital objects 150 using a combination of depth tracking and texture mapping. This technique has its limitations.

Figure 1B:
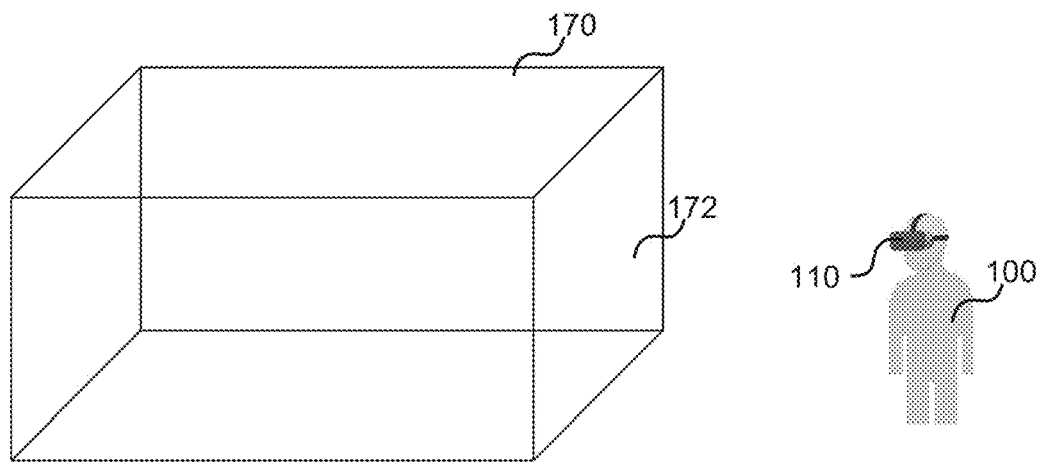
FIG. 1B illustrates the conventional augmented reality environment of FIG. 1A after the user exits the room.

First, this technique depends on mapping an area with well-defined boundaries (i.e., generally an indoor room) so that the mapped area may be used as a reference point for overlaying digital objects 150 over the real world environment from the user's point of view. This limits the scope of the augmented reality view. For example, as shown in FIG. 1B, after user 100 places digital objects 150, consider the case in which user 100 exits room 170 and views it from a different frame of reference—outside and through a window or transparent wall. When viewed outside room 170 and through window 172, AR headset 110 no longer recognizes the scanned area and boundaries 171 of room 170. When AR headset 110 views room 170 from this frame of reference, digital objects 150 no longer appear overlaid over the real world environment. Accordingly, the appearance of the digital objects in the augmented reality view is constrained to the user's presence in the room (i.e., the frame of reference in which the room was scanned).

Second, as this technique depends on scanning the physical space of an area where an object is placed, it cannot be used to place digital objects at a great distance (e.g., greater than 20-30 feet or the typical boundaries of a room). This is particularly the case in outdoor areas where boundaries are not well defined and AR headsets 110 do not have the required computational power for mapping the large surrounding area. Accordingly, user 150 is generally limited to placing digital objects in an indoor space and/or in close proximity. As the scanned area in which objects may be placed is additionally limited to the narrow field of view of headset 110, this makes it impractical or impossible to accurately place in the AR environment large digital objects (e.g., greater than 5 feet in one dimension) or digital objects at large distances from the user (e.g., greater than 50 feet).

Embodiments of the technology disclosed herein address these limitations. Systems and methods are described for placing large objects and objects separated by large distances in an AR environment. In various embodiments, an AR headset system may place and generate digital objects using relative geographical coordinates (e.g., latitude, longitude, and altitude) between the user's current position and the object being placed. Following the methods disclosed herein, a user of an AR headset system may place large digital objects (e.g., objects with a dimension of greater than 10 feet, 20 feet, or more) and/or objects at great distances from the user (e.g., greater than 50 feet, 100 feet, 200 feet, or more) into the augmented reality environment. Data associated with the generated digital objects (e.g., coordinates, size, orientation, textures, mesh, color, etc.) may then be stored for future use by the user or another user of an AR headset system.

In a first implementation, a digital object's geographical coordinates may be calculated by determining a user's geographical coordinates, using a distance determination device to measure a distance to a boundary in the user's real-world environment within the AR headset's field of view, and calculating an orientation (e.g., pitch, yaw, and roll) of the AR headset relative to the user's position. In a second implementation, a digital object's geographical coordinates may be calculated by determining the user's geographical coordinates, calculating an orientation of the AR headset relative to the user's position, and receiving input at a user input device (e.g., a mobile device or microphone) specifying at what distance to place and generate a digital object. In further implementations, placement of digital objects may be assisted by topography maps of the terrain where the object is placed, stored geographical coordinates of known landmarks or locations where the object is placed, and a graphical user interface (GUI) that displays a map of the user's surrounding location.

Figure 2A:
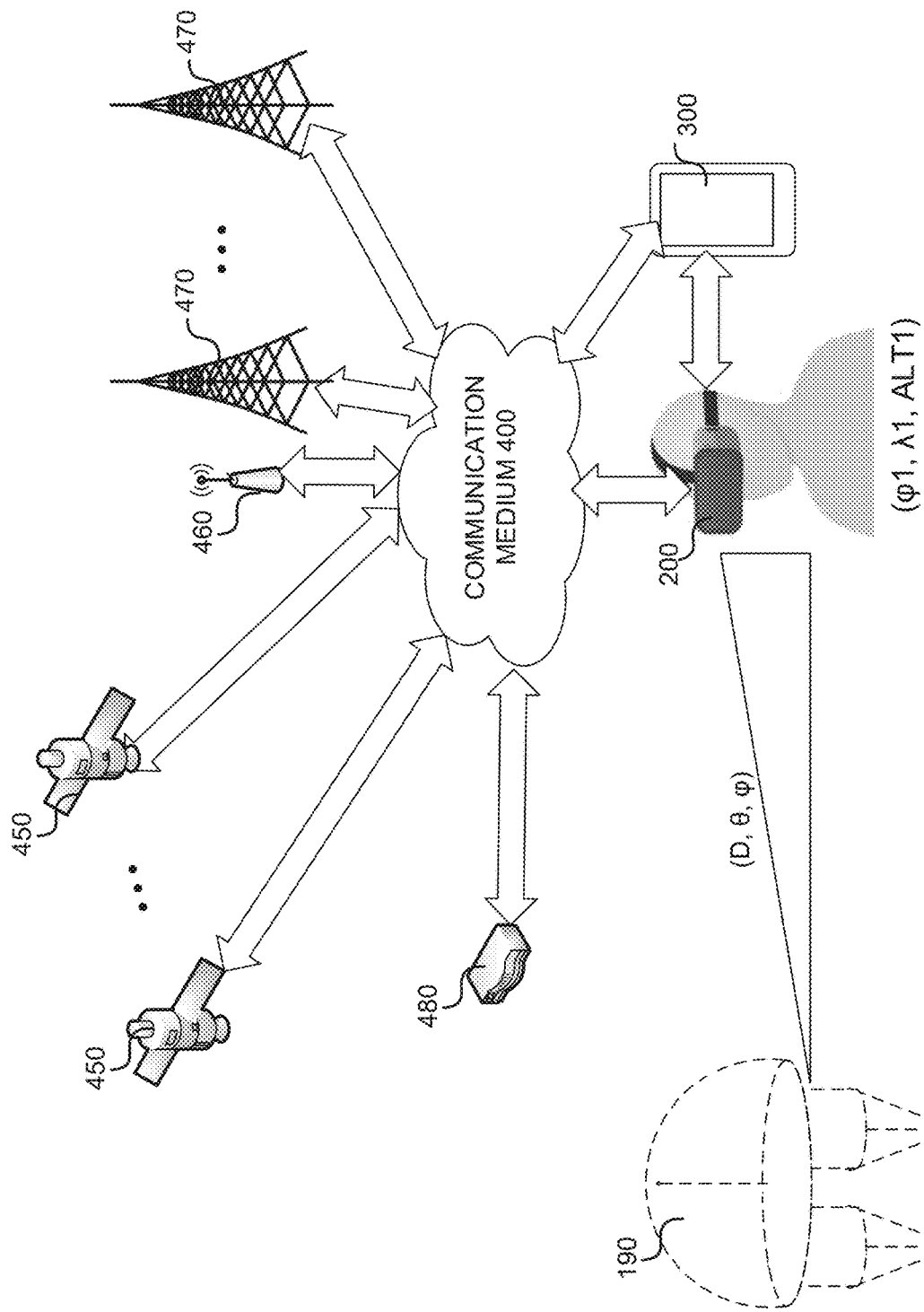
FIG. 2A illustrates an example system, including an AR headset and device, in which digital objects may be generated and placed in an augmented reality environment.

FIG. 2A illustrates an example system, including AR headset 200 and device 300, in which digital objects may be generated and placed in an augmented reality environment. In this system, a user of AR headset 200 places one or more digital objects 190 into an augmented reality environment that may be viewed through AR headset 200. Placement of digital objects 190 in this system may be based on an estimate of the user's geographical coordinates and the geographical coordinates of the digital objects relative to the user. Device 300 may assist AR headset 200 with one or more of the following processes: determination of the user's geographical position, providing a user interface for creating and placing digital objects, storing information associated with created digital objects, and generally offloading data processing tasks related to the augmented reality environment. Alternatively, AR headset 200 may perform all of these processes.

As shown, the user's geographical coordinates (i.e., the user's latitude ($\phi$), longitude ($\lambda$), and altitude (ALT)) may be calculated as ($\phi_1$, $\lambda_1$, $ALT_1$) using positional information received over communication medium 400. It should be noted that although embodiments described herein will primarily be described with reference to determining the latitude, longitude, and altitude of the user and placed object, in alternative embodiments, only the latitude and longitude may be determined.

The positional information may be received over communication medium 400 from a plurality of satellites 450, a plurality of cellular or radio stations 470, from a communication service provider, from a WiFi network, or some combination thereof. In embodiments, the positional information may be received and processed by AR headset system 200 and/or device 300. For example, in one embodiment, the user's position may be determined using a GPS receiver of AR headset 200 or device 300 that acquires time signals from three or more satellites 450 and determines the user's position using three-dimensional trilateration. In implementations of this embodiment, the GPS receiver may be a differential GPS (DGPS) that refines the estimate of the user's geographical coordinates using GPS signal correction information (e.g., information that accounts for delay in radio signals due to Earth's atmosphere) broadcast by a station 460 with known geographical coordinates.

In another embodiment, the geographical coordinates of the user may be determined relative to one or more WiFi access points 480 (e.g., a router) using received signal strength indication (RSSI), fingerprinting, angle of arrival (AoA) or time of flight (ToF) based techniques. In a further embodiment, a hybrid positioning system may find the location of AR headset 200 or device 300 using a combination of multiple positioning techniques (e.g., GPS, cellular tower signals, wireless internet signals, etc.)

Following determination of the geographical coordinates of the user, a digital object 190 may be placed in the user's augmented reality view with estimated geographical coordinates of ($\phi_2$, $\lambda_2$, $ALT_2$). In embodiments, further described below, the digital object's geographical coordinates may be estimated based on a combination of the user's geographical coordinates and positional information obtained by peripherals communicatively coupled to AR headset 200 (e.g., position sensors, distance determination devices, etc.). In various embodiments, the placed digital object may be an animated character, a building, a tree, a sign, readable text, or any other digital object that the user superimposes into or over the real-world environment.

As digital objects are placed using geographical coordinates, the user of AR headset system 200 may place large digital objects. For example, the digital objects may be buildings with a dimension of greater than 10 feet, 20 feet, or more. Additionally, the user, without having to substantially move around the real-world environment, may place objects separated by great distances from the user (e.g., greater than 50 feet, 100 feet, 200 feet, or more). Information associated with the placed digital object (coordinates, size, orientation, textures, mesh, color, etc.) may be saved for later use. For example, the digital object information may be retrieved by the user of AR headset 200 (e.g., from a memory of AR headset system 200 or device 300) or by user of another AR headset (e.g., over a network). The retrieved digital object information may then be used to reconstruct an augmented reality view for a user of an AR headset.

By way of example, a user of AR headset system 200 may place a variety of digital objects 190 throughout a theme park to create a scavenger hunt for a subsequent user of AR headset 200 or another AR headset. As the placement of digital objects is not constrained to a particular distance, placement of the digital objects throughout the theme park may be done quickly if, for example, the user places the objects while at a high vantage point (e.g., while riding a lift at the theme park).

Figure 2B:
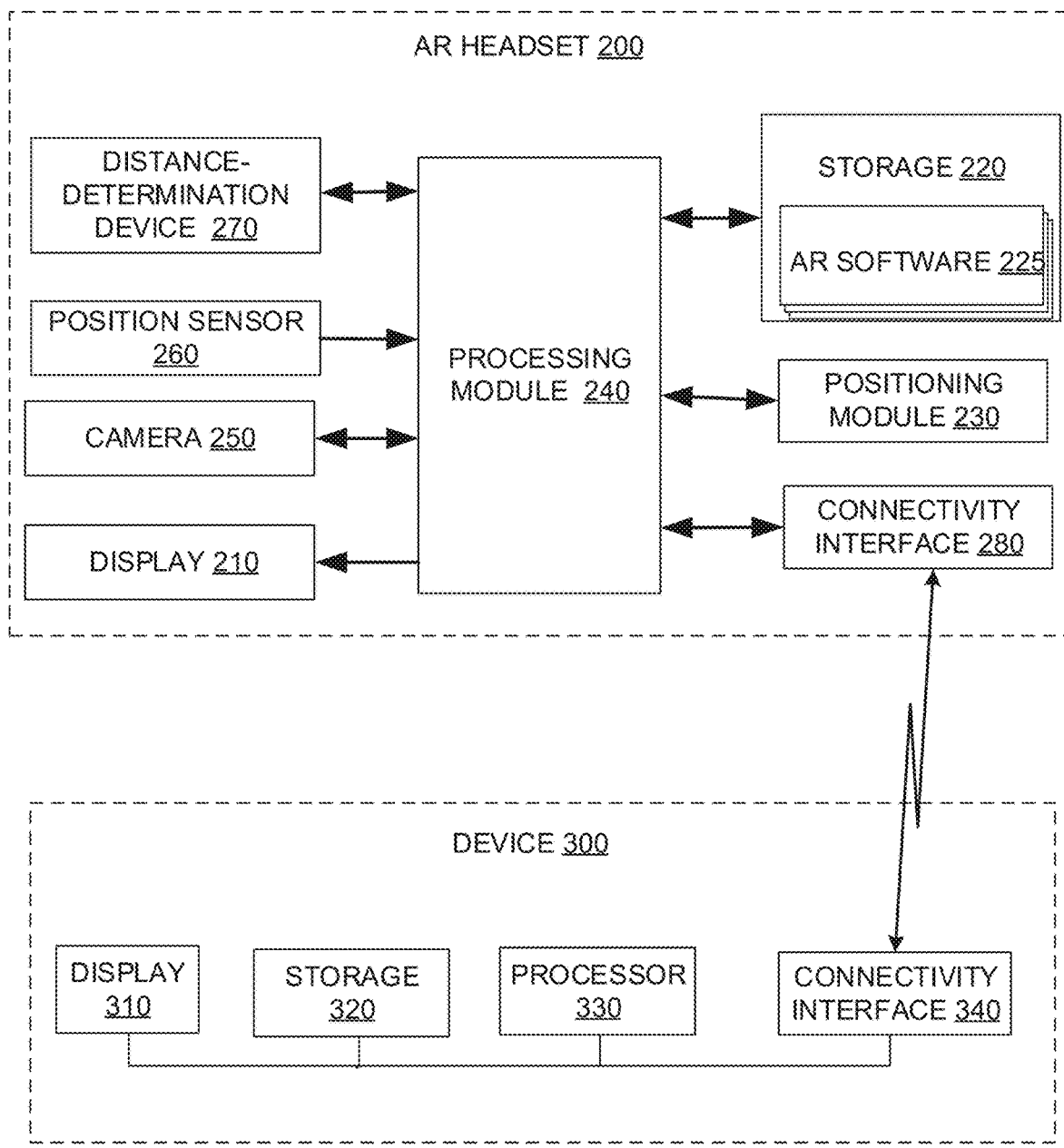
FIG. 2B is a block diagram illustrating an example architecture for components of the AR headset and device of FIG. 2A.

With specific reference now to AR headset 200 and device 300, FIG. 2B is a block diagram illustrating an example architecture for components of AR headset 200 and device 300.

AR headset 200, in various embodiments, is any head-mounted display system (e.g., glasses, goggles, a visor, helmets, etc.) that may generate an augmented reality view of a user's real world environment and display digital objects 190 overlaid over or in the real world environment. AR headset 200 may comprise a display 210, storage 220, positioning module 230, processing module 240, camera 250, position sensor 260, distance determination device 270, and connectivity interface 280. In implementations, display 210 may be an optical see-through display (e.g., a transparent OLED or LED screen that uses a waveguide to display the digital objects overlaid over the real-world environment). Alternatively, display 210 may be a video see-through display that supplements video of the user's real world environment with overlaid digital objects.

Storage 220 may comprise volatile memory (e.g. RAM), non-volatile memory (e.g. flash storage), or some combination thereof. In various embodiments, storage 220 stores AR software 225, that when executed by processing module 240 (e.g., a digital signal processor), generates an AR view on display 210. The AR view generated on display 210 may display one or more overlaid digital objects 190 and it may be used to place one or more digital objects 190. Additionally, storage 220 may store digital object information.

Positioning module 230 may comprise one or more devices for retrieving positional information over communication medium 400. For example, positioning module 230 may include a global positioning system receiver, a cellular receiver, a network interface card, an altimeter, or some combination thereof. The positional information retrieved by module 230 may be processed by processing module 240 to determine the geographical coordinates of AR headset 200. For example, application software installed in storage 220 may use the location of AR headset 200 from a GPS reading along with a map of declination (e.g., stored or retrieved from a network) to determine the geographical coordinates of headset 200.

Camera 250 captures a video stream of the real world environment such that AR software 225 may overlay digital objects over the real world environment to create an AR environment. For example, in embodiments where display 210 is a video display, the digital video stream captured by camera is overlaid with digital objects. In embodiments, camera 250 is an omnidirectional camera.

Position sensor 260 generates electronic input signals representative of the orientation of AR headset 200. These electronic input signals may be received and processed by circuitry of processing module 240 to determine the absolute orientation of AR headset 200 in the north-east-south-west (NESW) and up-down planes. As further described below, the orientation of AR headset 200 may be used to calculate the geographical coordinates of a digital object placed in the augmented reality environment. Processing module 240 may store this orientation information in storage 220. In various embodiments, position sensor 260 may comprise one or more gyroscopes, accelerometers, and magnetometers. For example, as illustrated in the environment of FIG. 2A, AR headset 200 is calculated to have a relative elevation or inclination angle θ (e.g., upward/downward tilt of headset relative to horizontal reference) and azimuthal angle Φ (e.g., position of headset relative to NESW plane) when placing digital object 190.

Distance-determination device 270 may determine a distance to a location (e.g., by reflecting light or an ultrasonic sound beam off a physical boundary). In embodiments, distance-determination device may include a light detection and ranging (Lidar) device, an ultrasonic distance-measuring sensor, an interferometer, or a depth sensor. In embodiments, distance-determination device 270 is configured to determine the distance to locations in the field of view of display 210. For example, the distance to physical boundaries at or around the center of the field of view may be determined.

Connectivity interface 280 may connect AR headset 200 to device 300 through a communication medium. The medium may comprise a wireless network system such as a BLUETOOTH system, a ZIGBEE system, an Infrared (IR) system, a Radio Frequency (RF) system, a wireless local area network, or the like. In further embodiments, connectivity interface 280 may connect AR headset system to the internet using a cellular network, a satellite network, a local area network, or some combination thereof.

Device 300 may comprise a display 310, storage 320, processor 330, and connectivity interface 340 that communicatively couples device 300 to AR headset 200. In embodiments, device 300 can be any device (e.g. a smartphone, a tablet, a laptop, game console, desktop computer, or a network of computers and/or servers, or a wearable device such as a smartwatch) that may supplement AR headset 200 in processes such as determining the user's position, generating digital objects for display in the augmented reality environment, storing digital object information associated with placed digital objects, and determining the user's orientation in the NESW plane. For example, device 300 may comprise its own positioning module (not shown) embodied in a cellular receiver and maps application. As another example, device 300 may comprise three magnetic field sensors, fixed perpendicular to each other, to determine the user's orientation in the NESW plane.

In one embodiment, storage 320 stores an AR application, that when executed by processor 330, displays a GUI on display 310 that allows a user to select or create digital objects for display and placement using AR headset 200. For example, a user may select a digital object's general shape, size, orientation, texture, and color. In implementations, the user may retrieve digital object template information over a network using the AR application. In further implementations, the user may create digital object profiles associated with one or more digital objects placed using AR headset 200. Another user may subsequently use these digital object profiles. For example, using the aforementioned digital object scavenger hunt as an example, a digital object profile may be created for a particular location (e.g., a theme park). In yet further implementations, the AR application of device 300 may display a map that assists in digital object placement and/or location. In alternative embodiments, an AR application stored on AR headset 200 may perform these same functions.

Figure 3:
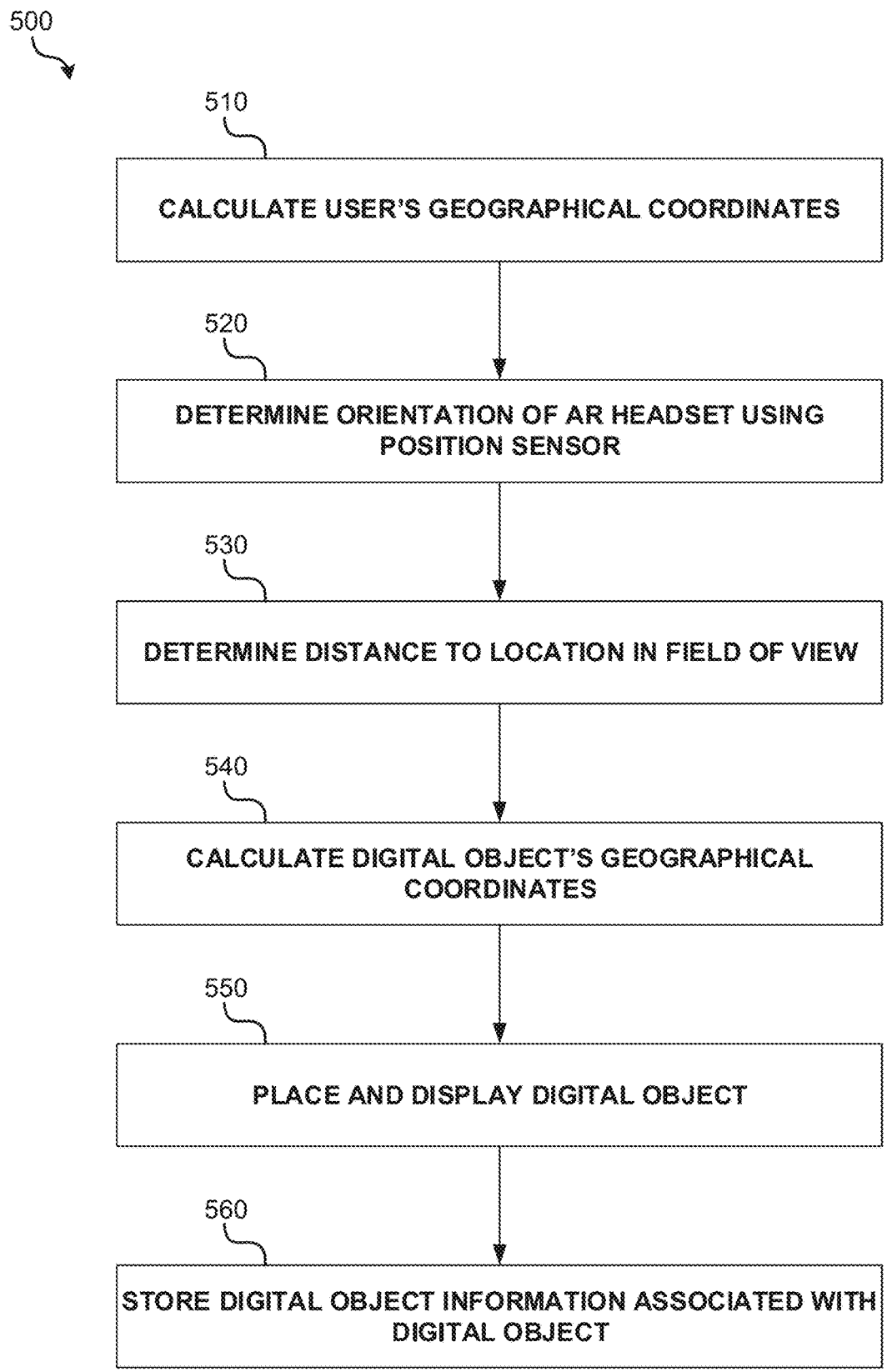
FIG. 3 is an operational flow diagram illustrating an example process that may be implemented to place digital objects in an augmented reality environment in accordance with the disclosure.

FIG. 3 is an operational flow diagram illustrating an example process 500 that may be implemented to place digital objects in an AR environment in accordance with the disclosure. In embodiments, process 500 may be performed using components of AR headset 200 and/or device 300.

At operation 510, the user's geographical coordinates are calculated. For example, positioning module 230 may retrieve positioning information from satellites 450, station 460, cellular towers 470, local WiFi access point 480, or some combination thereof. The positional information may comprise, for example, GPS satellite signal data, cellular tower signal data, wireless internet signal data, network environment data, and other data. The positional information retrieved by module 230 may be processed by processing module 240 to determine the geographical coordinates of AR headset 200. For example, a GPS receiver of AR headset 200 may receive position information from a plurality of satellites and use a map of declination to determine the user's geographic coordinates (e.g., $(\phi_1, \lambda_1, ALT_1)$). In some embodiments, AR headset 200 may utilize a differential GPS receiver to determine the user's geographical coordinates. In further embodiments, the determination of the user's geographical coordinates may be calibrated based on the presence of geocaches or landmarks in the vicinity of the user with known geographical coordinates.

At operation 520, the orientation of the AR headset may be determined using a position sensor. For example, electric signals generated by position sensor 260 may be processed by processing module 240 to determine the user's position. The orientation of the AR headset may be determined relative to the NESW plane and the up-down plane (i.e., tilt). For example, as illustrated in the environment of FIG. 2A, AR headset is determined to have an inclination angle $\theta$ (up-down tilt) and azimuthal angle $\Phi$ (position in NESW plane). In one embodiment, an inertial measurement unit comprising a gyroscope, an accelerometer, and a magnetometer may be used to determine the orientation of the AR headset. For example, a multi-axis magnetometer may determine the absolute orientation of AR headset 200 in the NESW plane, a multi-axis accelerometer may determine the absolute orientation of AR headset 200 in the up-down plane, and a multi-axis gyroscope may track changes in orientation.

Following determination of the orientation of the AR headset, at operation 530, a distance to a location in the field of view of the AR headset display may be determined in preparation for placing a digital object. For example, a user of AR headset 200 may want to place a digital object in front of a real-world physical boundary (e.g., a wall) in the center of the field of view of display 210. Accordingly, in one embodiment, the distance to the boundary may be determined using a distance determination device (e.g., device 270). In embodiments, the distance determination device may determine distance to the physical boundary by reflecting light or an ultrasonic sound beam off the physical boundary. For example, the distance-determination device may include a light detection and ranging (Lidar) device, an ultrasonic distance-measuring sensor, an interferometer, or a depth sensor.

Alternatively, in another embodiment a user may manually specify the distance to the digital object to be placed (or a landmark) without using a distance determination device. For example, the user may enter the distance into a user input device (e.g., using a touch user interface of device 300), using a voice user interface (e.g., speech-to-text recognition on device 300 or AR headset 200), or using another user interface input method. In embodiments, this distance is specified with respect to the center of the field of view of display 210.

At operation 540, the digital object's geographical coordinates may be calculated using the user's geographical coordinates, the orientation of AR headset 200, and the distance to a location in the field of view where the digital object will be placed. By way of example, as illustrated in FIG. 2A, the geographical coordinates ($\phi 2$, $\lambda 2$, ALT2) of digital object 190 may be determined based on the user's geographical coordinates ($\phi 1$, $\lambda 1$, ALT1), the orientation ($\theta$, $\phi$) of AR headset 200, and the distance D to the location in the field of view of the display of the AR headset.

For example, consider the case where the AR headset is oriented absolute north without any tilt. In this example, the calculated altitude and longitude of the digital object may be the same as the altitude and longitude of the user. The latitude of the digital object may be calculated based on the distance D and the user's latitude $\phi 1$ based on the number of degrees latitude per distance D at the user's geographical coordinates (e.g., if the user is at the equator, then one degree latitude is about 68.703 miles.) In various embodiments, the latitude and longitude of the AR headset may be determined using the haversine formula, Vincenty's formulae, or other geographical distance formula.

At operation 550, the digital object may be placed and displayed. For example, assuming the user does not move, the digital object may be placed and displayed in the center of the field of view of the AR headset at the determined distance. Placement of the digital object, in embodiments, may include creation and/or selection of a digital object (e.g., selection of a digital object template) having associated digital object information (e.g., a size, an orientation, a texture, a color, etc.).

In some embodiments, placement and positioning of digital objects may be assisted by the use of geocaches and/or landmarks with known geographical coordinates. For example, in some implementations, digital objects may be placed with reference to geocaches or landmarks with known geographical coordinates.

At operation 560, digital object information associated with the placed digital object, including the digital object's calculated geographical coordinates, may be stored for later use. For example, the digital object information may be stored in a digital object profile associated with one or more digital objects that were placed by the AR headset at determined geographical coordinates. In embodiments, digital object information may be transmitted over a network for storage and future retrieval by an AR headset system.

Figure 4:
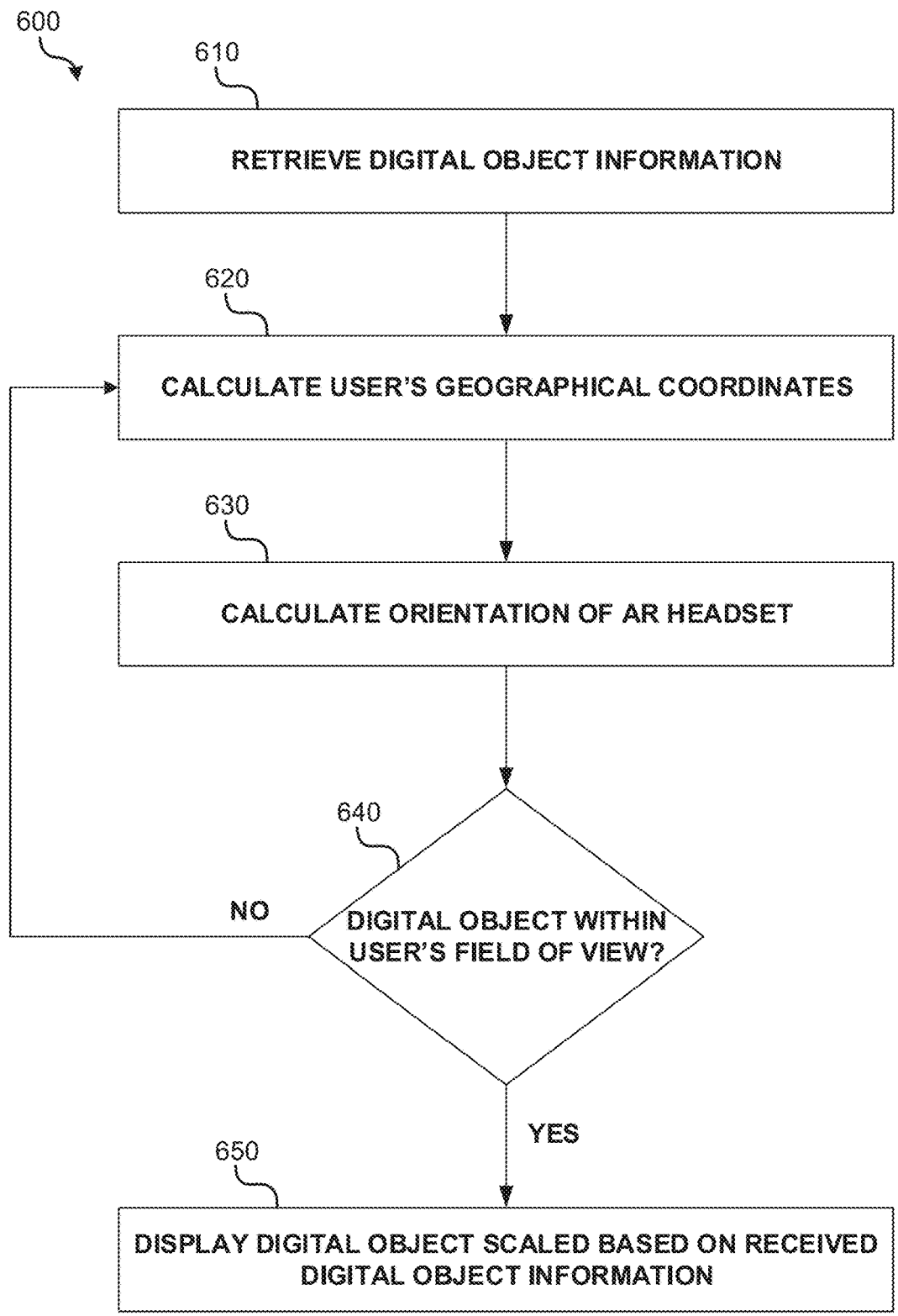
FIG. 4 is an operational flow diagram illustrating an example method that may be implemented by a user of an AR headset using stored digital object information associated with one or more digital objects, the digital object information including digital object geographical coordinates.

FIG. 4 is an operational flow diagram illustrating an example method 600 that may be implemented by a user of an AR headset (e.g. headset 200) using stored digital object information associated with one or more digital objects, the digital object information including digital object geographical coordinates. At operation 610, the stored digital object information (e.g., geographical coordinates, size information, orientation information, color information, texture information, etc.) may be received by the AR headset. For example, the digital object information may be received over a network. Some non-limiting examples of protocols over which digital object information may be received include: cellular telecommunications protocols, such as GSM, UMTS, CDMA2000, LTE, or WiMAX; wired communications methods, such as cable, DSL, dial-up, or fiber-optic; or wireless communications methods, such as satellite communications or Wi-Fi.

At operations 620 and 630, the user's geographical coordinates and the orientation of the AR headset are calculated. For example, the user's geographical coordinates and the orientation of the AR headset may be calculated in accordance with the embodiments described above. Given a known location of one or more digital objects (i.e., the retrieved digital object geographical coordinates) and the user's geographical coordinates, at decision 640 it is determined if a digital object is within the field of view of the AR headset display. This determination may be made, for example, if the digital object is within a threshold distance of the user (e.g., based on a comparison of geographical coordinates), the digital object is of a threshold size (e.g., large enough to be seen or generated given hardware constraints), or the digital object is within the line of sight (e.g., no occluding objects).

Given a determination that the digital object is within the field of view, at operation 650, the digital object may be displayed on the display of the AR headset, where the object is scaled and oriented based on the received digital object information. For example, given the current distance of the user (e.g., based on a comparison of geographical coordinates), the current position of the user (e.g., based on the user's geographical coordinates), and digital object information specifying the size, shape, and orientation of the digital object, the digital object may be displayed in a scaled proportion.

Example settings in which the disclosed systems and methods may be implemented are now described. In a first example, the disclosed systems and methods for placing digital objects may be implemented as part of a theme park scavenger hunt activity. For example, a user from a high vantage point (e.g., a tower or cable car) may use an AR headset system to place a variety or large or small digital objects on the ground below for a second player to find. Digital object information associated with the placed digital objects may be transmitted to a second user having an AR headset system so that the second user may find the digital objects as the second user wanders around the theme park.

Figure 5:
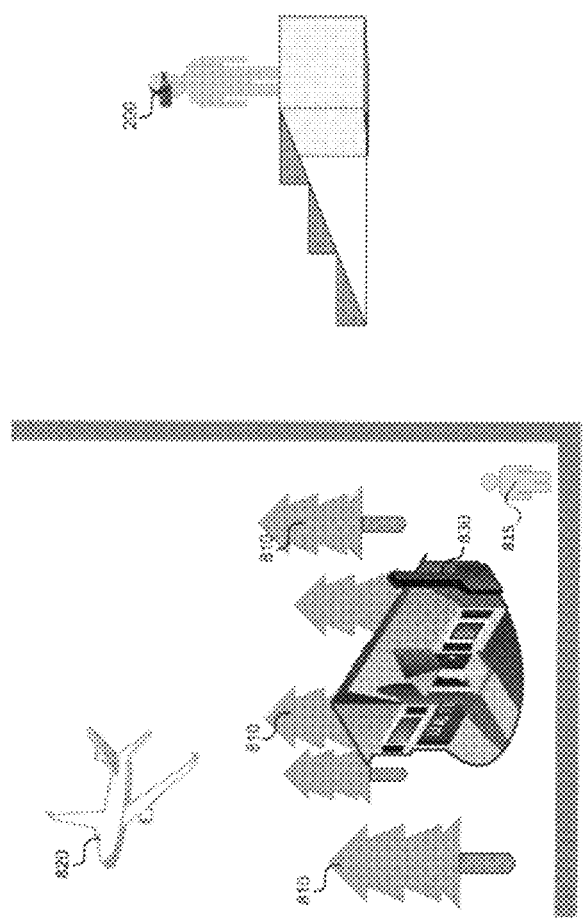
FIG. 5 illustrates an example environment in which embodiments disclosed herein may be implemented.

In a second example setting, the disclosed system may enhance movie production and direction, including location scouting and set dressing. FIG. 5 is one illustration of this example. As illustrated, a user of AR headset 200 may stand at a high vantage point, and, using the systems and methods disclosed herein, construct a "virtual set" by placing large and or small digital objects {e.g., trees 810, airplane 820, house 830) at a distance. Directors, actors, camera operators, and producers locally present at the filming of a scene may wear an AR headset display that enables viewing of the scene including the placed digital objects, where the digital objects are proportioned based on the location of the user and the their associated digital object information. Accordingly, actors {e.g., actor 815} or other physical objects having physical boundaries as described throughout may act in front of {e.g., or otherwise be positioned in front of} the digital objects instead of a blue screen, thereby eliminating the expense and time required to create real world models.

Figure 6:
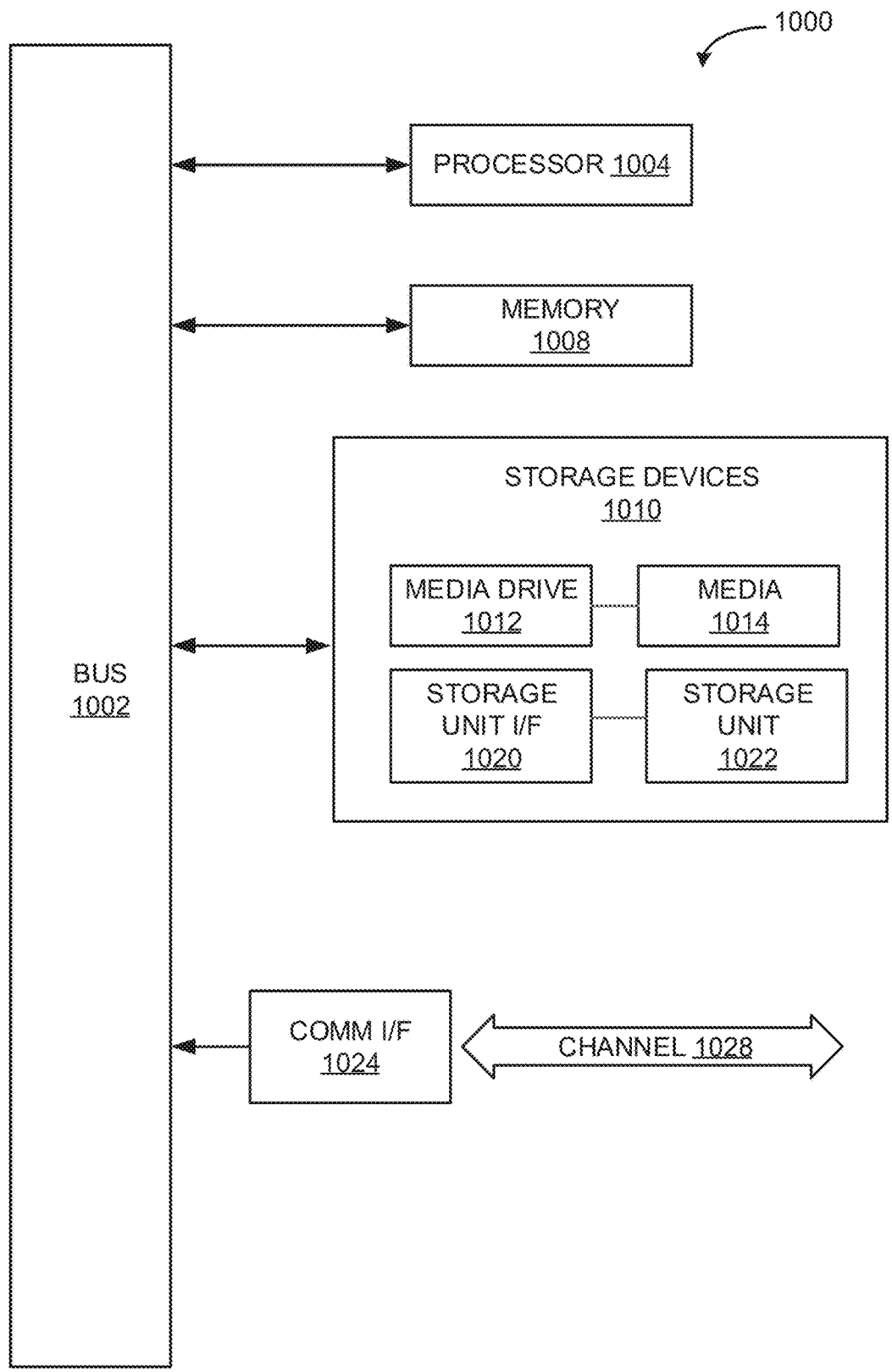
FIG. 6 illustrates an example computing module that may be used to implement various features of the methods disclosed herein.

FIG. 6 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example—computing module 1000. After reading this description, it will become apparent to a person skilled in the relevant art how to implement the application using other computing modules or architectures.

Referring now to FIG. 6, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1020, media 1014, and transitory channels 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method comprising:
    determining, by a processor, a first user geolocation of a first user using an augmented reality device, based on a latitude of the first user geolocation, a longitude of the first user geolocation, an altitude of the first user geolocation, or a combination thereof;
    determining, by the processor, a distance measurement between the first user geolocation and a point from the first user geolocation that the first user is viewing within a field of view of the augmented reality device, wherein the point lies along a boundary within the field of view;
    accessing, by the processor, map information based on the first user geolocation;
    determining, by the processor, an object geolocation at which a digital object is placed by the first user within the field of view, the determining based on the first user geolocation, the distance measurement, the map information, and landmark information associated with known geographical coordinates, wherein the determined object geolocation exceeds a distance threshold from the first user geolocation, and wherein a size of the digital object when placed at the determined object geolocation is proportioned based at least on the first user geolocation;
    displaying, by the augmented reality device, the digital object at the determined object geolocation; and
    transmitting information associated with the digital object and the determined object geolocation to a second augmented reality device utilized by a second user located at a second user geolocation different from the first user geolocation, wherein the information is configured to be used by the second augmented reality device, to display the digital object at the determined object geolocation at which the digital object is placed by the first user, within a second field of view associated with the second augmented reality device.

2. The method of claim 1, wherein determining the first user geolocation is further based on determining an orientation of the augmented reality device based at least on receiving electrical signals at a position sensor.

3. The method of claim 2, wherein the orientation of the augmented reality device is determined in a north-east-south-west plane.

4. The method of claim 1, wherein determining the distance measurement between the first user geolocation and the point from the first user geolocation that the first user is viewing within the field of view of the augmented reality device is further based on receiving an input indicating the distance measurement corresponding to the point.

5. The method of claim 1, wherein determining the distance measurement between the first user geolocation and the point from the first user geolocation that the first user is viewing within the field of view of the augmented reality device is further based on reflecting light or reflecting sound off the point that lies along the boundary.

6. The method of claim 1, wherein the boundary is an environmental boundary.

7. The method of claim 1, wherein the boundary is a field of view boundary.

8. One or more computer storage media storing computer-usable instructions that, when executed by one or more computing devices, causes the one or more computing devices to perform operations, the operations comprising:
    determining a first user geolocation of a first user using an augmented reality device, based on a latitude of the first user geolocation, a longitude of the first user geolocation, an altitude of the first user geolocation, or a combination thereof;
    determining a distance measurement between the first user geolocation and a point from the first user geolocation that the first user is viewing within a field of view of the augmented reality device, wherein the point lies along a boundary within the field of view;
    accessing map information, based on the first user geolocation;
    determining an object geolocation at which a digital object is placed by the first user within the field of view, the determining based on the first user geolocation, the distance measurement, the map information, and landmark information associated with known geographical coordinates, wherein the determined object geolocation exceeds a distance threshold from the first user geolocation, and wherein a size of the digital object when placed at the determined object geolocation is proportioned based at least on the first user geolocation;
    displaying the digital object at the determined object geolocation; and
    transmitting information associated with the digital object and the determined object geolocation, to a second augmented reality device utilized by a second user located at a second user geolocation different from the first user geolocation, wherein the information is configured to be used by the second augmented reality device, to display the digital object at the determined object geolocation at which the digital object is placed by the first user, within a second field of view associated with the second augmented reality device.

9. The one or more computer storage media of claim 8, wherein determining the first user geolocation is further based on determining an orientation of the augmented reality device, wherein the determining is based at least on receiving electrical signals at a position sensor.

10. The one or more computer storage media of claim 9, wherein the orientation of the augmented reality device is determined in a north-east-south-west plane.

11. The one or more computer storage media of claim 8, wherein determining the distance measurement between the first user geolocation and the point from the first user geolocation that the first user is viewing within the field of view of the augmented reality device is further based on receiving an input indicating the distance measurement corresponding to the point.

12. The one or more computer storage media of claim 8, wherein determining the distance measurement between the first user geolocation and the point from the first user geolocation that the first user is viewing within the field of view of the augmented reality device is further based on reflecting light or reflecting sound off the point that lies along the boundary.

13. The one or more computer storage media of claim 8, wherein the boundary is an environmental boundary.

14. The one or more computer storage media of claim 8, wherein the boundary is a field of view boundary.

15. An augmented reality system, comprising:
   an augmented reality device configured to:
   determine, by a processor communicatively coupled to the augmented reality device, a first user geolocation of a first user using the augmented reality device, based on a latitude of the first user geolocation, a longitude of the first user geolocation, an altitude of the first user geolocation, or a combination thereof;
   determine, by the processor, a distance measurement between the first user geolocation and a point from the first user geolocation that the first user is viewing within a field of view of the augmented reality device, wherein the point lies along a boundary within the field of view;
   access, by the processor, map information and terrain information, based on the first user geolocation;
   determine, by the processor, an object geolocation at which a digital object is placed by the first user within the field of view, the determining based on the first user geolocation, the distance measurement, the map information, and landmark information associated with known geographical coordinates, wherein the determined object geolocation exceeds a distance threshold from the first user geolocation, and wherein a size of the digital object when placed at the determined object geolocation is proportioned based at least on the first user geolocation;
   a display, communicatively coupled to the augmented reality device, configured to:
   display the digital object at the determined object geolocation; and
   a second augmented reality device utilized by a second user located at a second user geolocation different from the first user geolocation and in communication with the augmented reality device configured to:
   receive information, from the augmented reality device, associated with the digital object and the determined object geolocation; and utilizing the information associated with the digital object at the determined object geolocation received from the augmented reality device, display the digital object at determined object geolocation at which the digital object is placed by the first user, within a second field of view associated with the second augmented reality device.

16. The augmented reality system of claim 15, further comprising a positioning module, wherein the processor is communicatively coupled to the positioning module, and wherein the positioning module is configured to determine the first user geolocation, based on the latitude of the first user geolocation, the longitude of the first user geolocation, the altitude of the first user geolocation, or the combination thereof.

17. The augmented reality system of claim 15, further comprising a distance measurement device, wherein the processor is communicatively coupled to the distance measurement device, wherein the distance measurement device is configured to determine the distance measurement between the first user geolocation and the point from the first user geolocation that the first user is viewing within the field of view of the augmented reality device, wherein the point lies along the boundary within the field of view.

18. The augmented reality system of claim 15, wherein the processor is communicatively coupled to the display, wherein the display is configured to display the digital object at the determined object geolocation within the field of view.

19. The augmented reality system of claim 15, further comprising a position sensor, wherein determining the first user geolocation is further based on determining an orientation of the augmented reality device based in part on receiving electrical signals at the position sensor.

20. The augmented reality system of claim 15, wherein determining the distance measurement between the first user geolocation and the point from the first user geolocation that the first user is viewing within the field of view of the augmented reality device is further based on receiving an input indicating the distance measurement corresponding to the point.

* * * * *